(12) United States Patent
Kreutzer et al.

(10) Patent No.: US 10,167,782 B2
(45) Date of Patent: Jan. 1, 2019

(54) COOLING AIR LINE FOR REMOVING COOLING AIR FROM A MANHOLE OF A GAS TURBINE

(71) Applicant: Siemens Aktiengesellschaft, Munich (DE)

(72) Inventors: Philipp Kreutzer, Haltern am See (DE); Marco Larson, Mulheim (DE); Ansgar Sternemann, Herne (DE)

(73) Assignee: Siemens Aktiengesellschaft, Munich (DE)

( * ) Notice: Subject to any disclaimer, the term of this patent is extended or adjusted under 35 U.S.C. 154(b) by 310 days.

(21) Appl. No.: 14/916,280

(22) PCT Filed: Aug. 26, 2014

(86) PCT No.: PCT/EP2014/068065
§ 371 (c)(1),
(2) Date: Mar. 3, 2016

(87) PCT Pub. No.: WO2015/036233
PCT Pub. Date: Mar. 19, 2015

(65) Prior Publication Data
US 2016/0201560 A1    Jul. 14, 2016

(30) Foreign Application Priority Data
Sep. 10, 2013 (DE) .................. 10 2013 218 093

(51) Int. Cl.
*F01D 25/14* (2006.01)
*F02C 9/18* (2006.01)
(Continued)

(52) U.S. Cl.
CPC .............. *F02C 9/18* (2013.01); *F01D 5/005* (2013.01); *F01D 25/14* (2013.01); *F01D 25/24* (2013.01);
(Continued)

(58) Field of Classification Search
CPC ...... F02C 6/08; F02C 7/18; F02C 9/18; F01D 5/005; F01D 25/12; F01D 25/14;
(Continued)

(56) References Cited

U.S. PATENT DOCUMENTS 2,257,982 A * 10/1941 Seippel .................... F02C 9/18
290/2
6,189,211 B1    2/2001 Suter
(Continued)

FOREIGN PATENT DOCUMENTS

DE    19821889 A1    11/1999
DE    19936170 A1    2/2001
(Continued)

*Primary Examiner* — Gerald L Sung
*Assistant Examiner* — James McGlynn
(74) *Attorney, Agent, or Firm* — Beusse Wolter Sanks & Maire

(57) ABSTRACT

A gas turbine having a compressor, a turbine unit, at least one combustion chamber and a secondary air system, which secondary air system has at least one cooling line having a compressor-side inlet for removing cooling air from the compressor and a turbine-side outlet for leading the cooling air onward into the turbine unit, wherein the cooling air line at the compressor-side inlet is connected fluidically to a housing opening of the gas turbine which adjoins a cavity in the gas turbine and which, during operation, guides compressor air, and wherein the housing opening is formed as a manhole.

3 Claims, 2 Drawing Sheets

(51) Int. Cl.
*F01D 5/00* (2006.01)
*F01D 25/24* (2006.01)
*F02C 7/18* (2006.01)

(52) U.S. Cl.
CPC ............ *F02C 7/18* (2013.01); *F05D 2230/72* (2013.01); *F05D 2260/234* (2013.01)

(58) Field of Classification Search
CPC ........ F01D 25/24; F01D 25/28; F01D 25/285; F04D 29/5806; F04D 29/584; F04D 29/5846; F05B 2260/20; F05D 2230/72; F05D 2260/20; F05D 2260/234
See application file for complete search history.

(56) References Cited

U.S. PATENT DOCUMENTS

| | | | |
|---|---|---|---|
| 7,237,386 B2 | 7/2007 | Hoffmann et al. | |
| 7,299,618 B2 | 11/2007 | Terazaki et al. | |
| 8,355,854 B2 * | 1/2013 | Childers | F02C 6/08 60/784 |
| 8,820,148 B2 * | 9/2014 | McCarvill | F01D 25/24 73/112.01 |
| 9,494,039 B2 * | 11/2016 | Von Arx | F01D 9/042 |
| 9,624,788 B2 * | 4/2017 | Araki | F01D 21/00 |
| 9,631,512 B2 * | 4/2017 | Lockyer | F01D 25/002 |
| 2009/0053036 A1 | 2/2009 | Crawley et al. | |
| 2013/0084172 A1 | 4/2013 | Kasibhotla et al. | |

FOREIGN PATENT DOCUMENTS

| | | |
|---|---|---|
| DE | 102004057985 A1 | 7/2005 |
| DE | 102008044442 A1 | 2/2009 |
| JP | 2012202242 | 10/2012 |
| WO | 03038255 A1 | 5/2003 |

* cited by examiner

COOLING AIR LINE FOR REMOVING COOLING AIR FROM A MANHOLE OF A GAS TURBINE

CROSS REFERENCE TO RELATED APPLICATIONS

This application is the US National Stage of International Application No. PCT/EP2014/068065, filed Aug. 26, 2014, and claims the benefit thereof. The International Application claims the benefit of German Application No. DE 102013218093.4, filed Sep. 10, 2013. All of the applications are incorporated by reference herein in their entirety.

FIELD OF INVENTION

The invention relates to a gas turbine having a compressor, a turbine unit, at least one combustion chamber and a secondary air system, which secondary air system has at least one cooling air line with a compressor-side inlet for drawing cooling air from the compressor and a turbine-side outlet for conveying the cooling air into the turbine unit.

BACKGROUND OF INVENTION

During partial load operation of a gas turbine, the combustion temperature in the combustion chamber typically drops. This also causes a drop in the primary zone temperature (TPZ), i.e. also the combustion chamber temperature, which is relevant for CO emissions. If the temperature falls below a predefined minimum value of the TPZ (e.g. TPZ<1400, ° C. for 10, ppmv CO emissions), the production of CO emissions increases, and as a result the limit of the useful partial load range of the gas turbine—which conforms to CO emissions limits—is reached. Where legal limits on CO emissions exist, this circumstance can force the operator of the gas turbine to switch off the gas turbine since it is sometimes no longer possible to further reduce the power of the gas turbine without simultaneously exceeding the relevant CO emissions limit.

One technical solution, known to the applicant from the internal prior art, for reducing CO emissions in partial load operation relates to diverting and bypassing cooling air so as to reduce the quantity of compressor outlet air which enters the combustion chamber. Thus, combustion in the combustion chamber can take place with a relatively large quantity of fuel and at a relatively high TPZ, thus reducing CO emissions. The pipes required for bypassing and diverting cooling air, or the pipe ends generally designed as outflow and inflow line stubs, are in this case securely attached to the gas turbine casing. When considering these components and their arrangements, it is particularly important to ensure that both the mechanical and the operational stability of the gas turbine is not greatly influenced.

Furthermore, also with regard to attaching the pipes or the pipe ends, it is important to ensure that the accessibility of the gas turbine for maintenance purposes is not markedly restricted. In that regard, attaching such pipes is subject to limits relating to stability, operation and maintenance.

SUMMARY OF INVENTION

An object of the present invention is to propose an improved attachment of a cooling air line to a gas turbine, which on one hand permits simple attachment of the cooling air line to the gas turbine, and on the other hand does not markedly restrict the accessibility of the gas turbine. In particular, attaching the cooling air line to the gas turbine should take place in a region in which the resulting operational restrictions, such as a fundamental influence on the flow characteristics of the compressor end air, are small.

These objects, on which the invention is based, are achieved with a gas turbine as claimed.

The objects on which the invention is based are achieved in particular with a gas turbine having a compressor, a turbine unit, at least one combustion chamber and a secondary air system, which secondary air system has at least one cooling air line with a compressor-side inlet for drawing cooling air from the compressor and a turbine-side outlet for conveying the cooling air into the turbine unit, wherein the cooling air line is fluidically connected, at the compressor-side inlet, to a casing opening of the gas turbine which adjoins a cavity of the gas turbine which, in operation, conveys compressor air, and wherein the casing opening is designed as a manhole.

Designing the casing opening as a manhole provides on one hand easy access to the gas turbine without at the same time having to markedly restrict the accessibility of the gas turbine for maintenance purposes. On the other hand, the gas turbine can also be provided with a cooling air line without this requiring that other casing parts of the gas turbine be machined or modified. This relates in particular to those casing parts which, when modified, could result in operational restrictions for the gas turbine, for example in that the fundamental flow characteristics of the compressor end air in the gas turbine would be affected.

At this point, it is to be noted that the cooling air line may comprise multiple components, for example pipes, stubs, flanges, connectors, etc. In the present context, therefore, a cooling air line should be interpreted in broad terms with respect to its scope of definition. In essence, the cooling air line is to be understood as a cooling air system which fluidically connects the casing opening in the region of the compressor to the turbine unit.

It is further to be noted that a manhole is to be understood as an access opening which is designed to allow maintenance personnel access to the interior of the gas turbine when carrying out maintenance work on the gas turbine. In this context, a manhole is normally designed to be large enough for a person to reach at least partially, with the torso or the upper body, through this opening into the interior of the gas turbine.

According to a first embodiment of the invention, it is provided that the cooling air line comprises at least one pipe and an adapter part, wherein the casing-opening-side end of the pipe is connected to the adapter part, which adapter part is connected to the casing opening via a first opening. In this context, the adapter can in particular be embodied as a double stub to which the at least one pipe is attached. Attachment is in this context effected for example by means of suitable connection openings. According to this embodiment, the adapter part is designed such that its first opening has a suitable shape for connecting to the casing opening of the gas turbine. In particular, the first opening is designed so as to have a shape that mates with the casing opening. According to this embodiment, it is thus possible for example to modify the secondary air system of the gas turbine without having to carry out a structural modification of the gas turbine, since all of the structural modifications can be carried out on the adapter part itself or on the at least one pipe.

According to another embodiment of the invention, it is provided that, in the gas turbine, the adapter part has a second opening opposite the first opening, which second opening is configured as a manhole and can be closed with a removable cover. Thus, the gas turbine remains accessible without it being necessary to create additional manholes on the gas turbine casing.

According to a further embodiment of the invention, it is provided that the adapter part has connection parts or connection flanges by means of which the at least one pipe can be connected to the adapter part. It is thus possible to create a maintenance-friendly modular construction which also for example permits targeted replacement of individual components, for example individual pipes. In addition, on-site assembly of the cooling air line can be made substantially easier. If the adapter part also has, for example, a number of such connection parts or connection flanges, which number is greater than the number of pipes, it is also still possible for the secondary air system to subsequently be easily extended. The connection parts or connection flanges can also be closed with a suitably shaped cover.

According to another advantageous embodiment of the invention, it is provided that the gas turbine has at least two or exactly two pipes, in which are arranged valves for setting the throughflow quantity. Consequently, the quantity of cooling air drawn from the casing opening can be metered, such that it is also for example possible to take into account fluidic restrictions due to the extension in terms of components.

The invention is described in detail below with reference to individual figures. In this context, it is to be noted that the figures are to be understood as merely schematic, and represent no limitation with respect to the practicability of the invention.

It is also to be noted that components with identical reference signs have identical technical functions.

It is also to be noted that, in the present case, the technical features presented in the figures are claimed in any combination with one another, insofar as this combination can achieve the objects upon which the invention is based.

DETAILED DESCRIPTION OF INVENTION

Figure 1:
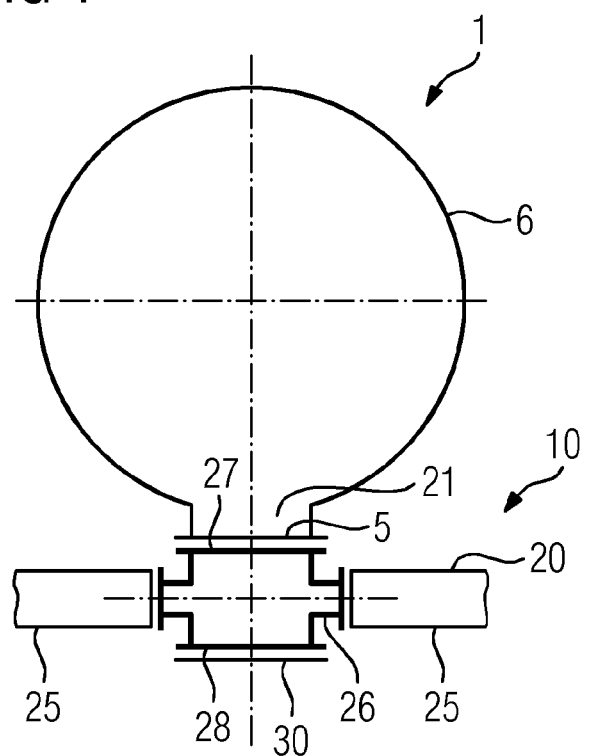
FIG. 1 shows a first embodiment of the gas turbine 1 according to the invention, in a schematic lateral sectional representation.

FIG. 1 shows a first embodiment of the gas turbine 1 according to the invention in a schematic lateral sectional representation, in section through a region of the compressor. The gas turbine 1 has a casing 6 which comprises a casing opening 5 that is designed as a manhole. According to this embodiment, the casing opening 5 is designed as a connection stub to which further components can be connected by means of a flange (not provided with a reference sign). In this context, in prior art gas turbines, this flange is closed with a removable cover 30 which is opened only for carrying out maintenance work.

According to the present embodiment of the invention, the gas turbine 1 now has an adapter part 26 which on one side is fluidically connected to the casing opening 5. Typically, the adapter part 26 has, to that end, a counter-flange which can be connected to the flange of the stub of the casing opening 5. The connection is in this context effected via a first opening 27 of the adapter part 26 which is arranged opposite a second opening 28 of the adapter part 26. This second opening 28 can be closed with a removable cover 30. Perpendicular to the connection line of the first opening 27 and the second opening 28 of the adapter part 26, there are provided on the adapter part 26 further connection parts or connection stubs by means of which it is possible to connect pipes 25. The connection between the adapter part 26 and the pipes 25 is in this context once again effected by means of a suitable connection flange.

The adapter part 26 and the pipes 25 form part of a secondary air system 10. The secondary air system 10 comprises a cooling air line 20 which also has the adapter part 26 and the pipes 25. The first opening 27 of the adapter part 26, which is connected to the casing opening 5, is located at the compressor-side inlet 21 of the cooling air line 20 and thus makes it possible to draw cooling air from the compressor (not shown here). This cooling air can be fed to a turbine-side outlet (also not shown here) at the turbine unit (also not shown here).

Figure 2:
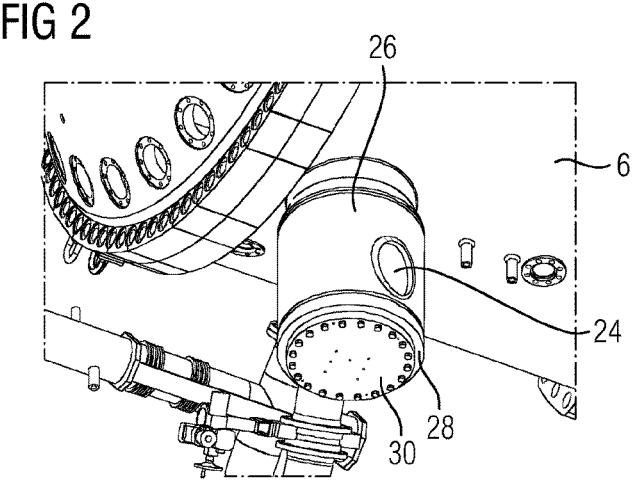
FIG. 2 shows another embodiment of the gas turbine 1 according to the invention, in a perspective lateral representation, but without pipes.

FIG. 2 shows another embodiment of the gas turbine 1 according to the invention, in a perspective lateral representation, but without pipes 25. Here, the adapter part 26 is attached below the casing 6 of the gas turbine 1 and permits, via connection openings 24, the lateral connection of pipes 25 (not shown here). One end of the adapter part 26, on a side oriented away from the gas turbine 1, is provided with a removable cover 30 which can be removed for maintenance work. In this context, it is to be noted that the second opening 28 of the adapter part 26, which is covered by the cover 30, essentially corresponds to the size of the first opening 27, which is connected to the casing opening 5. It is thus possible to ensure that the gas turbine 1 remains accessible. Both openings, 27 and 28, are thus designed as manholes.

Figure 3:
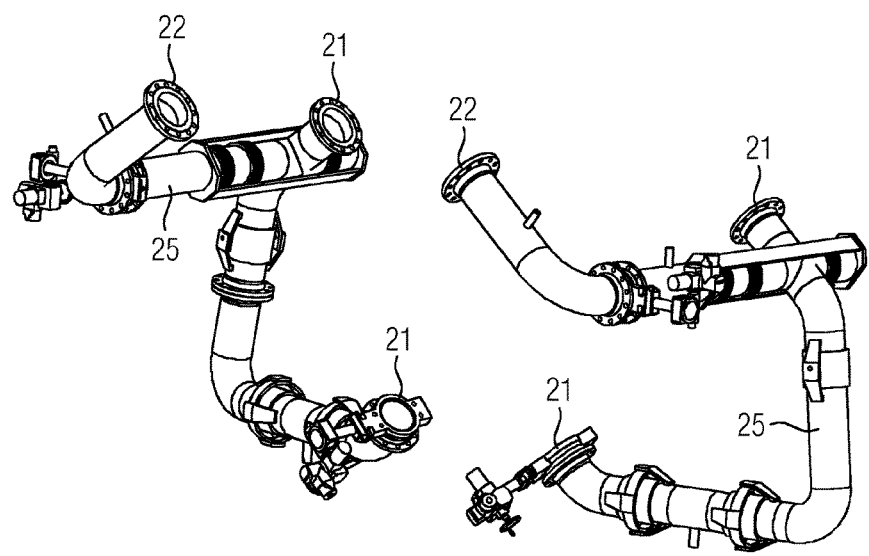
FIG. 3 shows an embodiment of pipes 25, as they might be connected in a gas turbine 1 according to FIG. 2, in a perspective lateral representation.

FIG. 3 shows an embodiment of two pipes 25, as they might be connected in a gas turbine 1 according to FIG. 2, in a perspective lateral representation. In this context, the cooling air line 20 has a compressor-side inlet 21 for drawing cooling air from the compressor and a turbine-side outlet 22 for conveying the cooling air into the turbine unit.

Further embodiments can be found in the subclaims.

The invention claimed is:

1. A gas turbine comprising:
   a compressor,
   a turbine unit,
   at least one combustion chamber, and a cooling air system, which cooling air system comprises at least one cooling air line comprising a compressor-side inlet for drawing cooling air from the compressor and a turbine-side outlet for conveying the cooling air into the turbine unit,
   wherein the at least one cooling air line is fluidically connected, at the compressor-side inlet, to a casing opening of the gas turbine which adjoins a cavity of the gas turbine which, in operation, conveys compressor air,
   wherein the casing opening is designed as a manhole that permits manhole-type access,
   wherein the at least one cooling air line further comprises a pipe and an adapter part, the adapter part comprising a first opening secured to the casing opening, a second opening opposite the first opening, and a removable manhole cover over the second opening, wherein the adapter part acts as a manhole extension over the casing opening, and wherein the adapter part further comprises a first lateral opening between the first opening and the second opening to which the pipe is connected, and wherein the adapter part is configured to permit the manhole-type access to the compressor via the second opening when the removable manhole cover is removed with the pipe still connected to the first lateral opening.

2. The gas turbine as claimed in claim 1, wherein the adapter part comprises a second lateral opening disposed between the first opening and the second opening, wherein the at least one cooling air line comprises two pipes, in each of the two pipes is arranged a respective valve for setting a respective through flow quantity, and each of the two pipes is connected to a respective lateral opening of the first lateral opening and the second lateral opening, and wherein the adapter part is configured to permit the manhole-type access to the compressor via the second opening when the removable manhole cover is removed with each of the two pipes still connected to the respective lateral opening.

3. A gas turbine comprising:

a compressor comprising a manhole, a manhole cover, a turbine unit, a combustion chamber; and a cooling air system comprising an adapter part and a pipe;

wherein the adapter part comprises a first opening secured to the manhole, a second opening opposite the first opening, and a lateral opening disposed between the first opening and the second opening, wherein the adapter part acts as a manhole extension over the manhole;

wherein the pipe connects to the lateral opening and leads to the turbine unit; and wherein the adapter part is configured to permit manhole-type access to the compressor via the second opening when the manhole cover is removed with the pipe still connected to the lateral opening.

\* \* \* \* \*